Feb. 5, 1963 J. H. HOLLOWAY ETAL 3,076,942

MOLECULAR BEAM FREQUENCY STANDARD

Filed April 13, 1961

INVENTORS
JOSEPH H. HOLLOWAY
ARTHUR O. McCOUBREY
BY Kenway, Jenney & Hildreth
ATTORNEYS 3,076,942

MOLECULAR BEAM FREQUENCY STANDARD

Joseph H. Holloway and Arthur O. McCoubrey, Topsfield, Mass., assignors to National Company, Inc., Malden, Mass., a corporation of Massachusetts Filed Apr. 13, 1961, Ser. No. 102,749
15 Claims. (Cl. 331—3)

Figure 1:
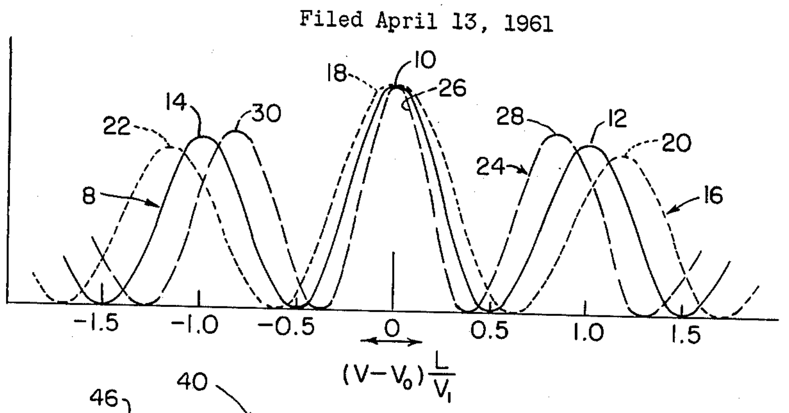

This invention relates to a molecular beam frequency standard incorporating an improved circuit to indicate proper or improper stabilization of the oscillator which is controlled on peaks of the molecular resonance pattern. More specifically, it relates to a twin cavity molecular beam standard in which the frequency of a controlled oscillator is compared with an atomic or molecular resonance frequency by using the oscillator output to cause energy level transitions corresponding to the resonance frequency. The molecular resonance pattern has a center peak and side peaks, and for proper operation, the oscillator should be stabilized on the center peak. Our invention uses amplitude modulation of the oscillator output voltage to detect improper stabilization on a side peak.

Molecular beam apparatus of the type in which our invention may be incorporated is described in the copending application of J. R. Zacharias et al., for "Molecular Beam Apparatus," Serial No. 693,104, filed October 27, 1957, Patent No. 2,972,115, assigned to the assignee of this application. As disclosed therein, the frequency of a controllable oscillator is compared with an atomic resonance frequency, and a correction signal obtained from this comparison is used to correct the oscillator frequency and hold it at a specific desired value. More specifically, the frequency standard utilizes as a reference the substantially invariant frequency corresponding to the transition of a molecule or atom from one energy state to another. A beam of molecules, for example, may be passed through a magnetic or electric separator which screens out the molecules in the higher of the two states, passing on the molecules in the lower state. The beam then enters a resonant cavity in which it encounters radiation from an oscillator whose frequency nominally equals the molecular or atomic resonance frequency corresponding to the difference in the energy levels of the two states. The relation between resonance frequency $\nu_0$ and energy level separation is given by, $$\nu_0 = \frac{W_2 - W_1}{h}$$

where: $(W_2 - W_1)$ is the difference in energy between the two states, and $h$ is Planck's constant. The molecules absorb energy from the radiation and enter a super-position state between the first two states.

Upon leaving the resonant cavity, the beam passes through an intermediate region where the molecules are essentially undisturbed by outside effects, and it then enters another resonant cavity to which energy from the oscillator is fed. A number of the molecules are lifted to the higher state and the others are returned to the lower state. The closer the frequency of the radiation corresponds to the resonance frequency, the greater is the number of molecules elevated to the higher state. The beam then passes through another separator which discards the molecules in one of the states and directs those in the other state to a detector. The detector provides an electrical signal proportional to the number of molecules making the transition to the higher energy state, thus maintaining the oscillator frequency at the value determined by the difference in energy between the two energy states.

Instead of using the energy from the oscillator to boost molecules from the lower to the upper of two states, one may use it to stimulate emission of radiation by molecules in the upper state. These molecules thus drop to the lower state, and the number so doing is again dependent on the proximity of the oscillator frequency to the molecular resonance frequency. When the system is operated in this manner, the first separator is adjusted to pass the upper state molecules rather than those in the lower state through the resonant cavities.

The words "molecule" and "molecular" are used in their generic sense herein, as referring to the smallest particle in a gas capable of independent movement. Since such particles, particulary in the case of cesium and other preferred metals, may consist of single atoms, these words are used interchangeably with "atom" and "atomic."

The frequency standards disclosed in the above-identified applications generally utilize energy levels of cesium or other alkali metal atoms which correspond to certain relationships between the magnetic fields of certain of their electrons and the atomic nuclei. In the case of cesium, these energy levels are the $(f, m_f)$ (3, 0) and (4, 0) levels. The advance from the 3, 0 level to the 4, 0 level by absorbing energy from electromagnetic radiation through interactions of the electron magnetic fields with the time varying magnetic field of the radiation. However, it should be understood that various resonances of other molecules may be used in molecular beam frequency standards. For example, in the copending application of Frederick W. Lipps et al. for "Carbon Monoxide Frequency Standard," Serial No. 851,605, filed November 9, 1959, there is described a frequency standard using an electrically excited resonance of the carbon monoxide molecule.

As pointed out above, the frequency of the control oscillator is stabilized at a molecular resonance frequency, as indicated by a maximum or peak in the number of molecules which have undergone a change in state upon exposure to energy from the oscillator for the second time. However, the molecular resonance curve, i.e., a plot of the number of molecules changing state as a function of oscillator frequency, also shows a number of side peaks symmetrically disposed about the center resonance frequency peak. If the oscillator frequency corresponds to the frequency of one of these side peaks, it will be locked there by the stabilization circuit in the same manner as if it were on the resonance frequency. However, stabilization on a side peak is undesirable for several reasons. The positions of these peaks are not stable; they vary in frequency in response to a number of conditions, as described below. Furthermore, regardless of the stability of the side peaks, stabilization of the local oscillator on one of them is highly undesirable in a frequency standard whose nominal output frequency is the frequency of the center peak i.e., the molecular resonance frequency.

The main problem caused by the occurrence of the side peaks in the molecular resonance curve stems from the fact that it is possible for the oscillator to be stabilized on one of them without any indication of this fact. This can occur when the frequency standard is initially turned on, since during warm up the frequency of the electronic oscillator may pass through a side peak frequency before reaching the molecular resonance frequency. Also, in a case where the oscillator is stabilized at the right point, sharply changing conditions such as line surges, etc. may cause its frequency to shift faster than it can be corrected by the servo stabilization system. It may thus jump to a side peak frequency and become stabilized at that point.

Accordingly, it is a principal object of our invention to provide an improved molecular beam frequency standard which indicates when the controlled oscillator is locked to a side peak of the molecular resonance pattern.

A more general object of our invention is to provide improved means for distinguishing the side peaks of a molecular resonance pattern from the center peak.

A further object of our invention is to provide a molecular beam frequency standard that indicates whether the side peak to which the oscillator is locked is higher or lower than the frequency of the center or molecular resonance peak.

Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

Figure 2:
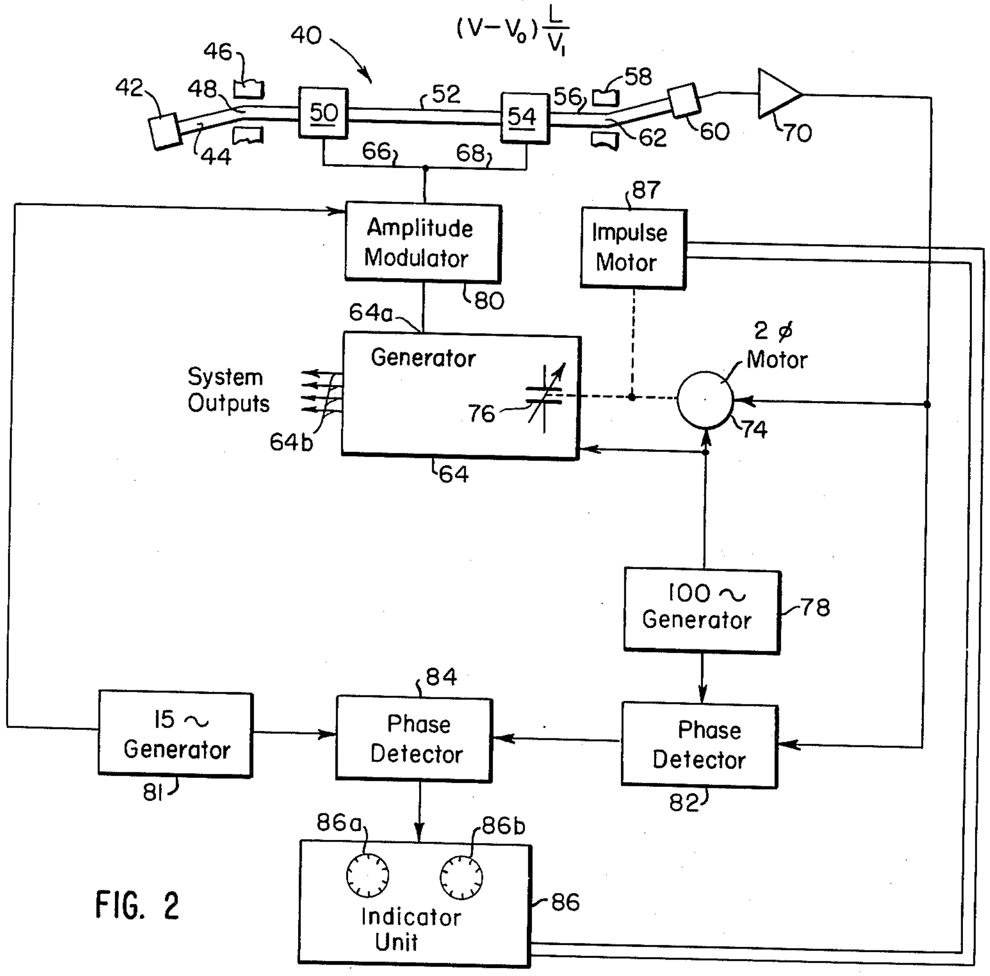

For a fuller understanding of the nature and objects of the invention, reference should be had to the following detailed description taken in connection with the accompanying drawings, in which:

FIGURE 1 is a graph containing molecular resonance patterns provided by a resonance unit of the type incorporated in our apparatus for three discrete molecular velocities, and FIGURE 2 is a schematic diagram of a molecular beam frequency standard incorporating our invention.

I. GENERAL DESCRIPTION OF THE INVENTION

In general, our invention makes use of the fact that, unlike the center of resonance peak, the center frequency of the side peaks of the resonance curve varies according to the velocity of the molecules in the beam most subject to change of energy state. The molecular beam contains molecules distributed over a wide range of velocities, and the band of velocities most likely to be involved in change of energy state depends on the power level of the radiation from the controlled oscillator used to effect transitions.

Thus, by varying the power level, one may change the group of molecular velocities having a high probability of energy state transition and thereby alter the positions of the side peaks of the resonance curve while leaving unaffected the position of the center peak. In the apparatus described below, the amplitude of the controlled oscillator radiation applied to the molecular beam is modulated, preferably at a low rate, thus causing the center frequencies of the side peaks to vary up and down in frequency. If the oscillator frequency is locked to a side peak, the frequency stabilization system, which controls the oscillator frequency to keep it on the center of the peak, will develop an error correction signal which varies at the rate of the amplitude modulation. This frequency component in the error signal is absent when the frequency is stabilized on the center peak, and, therefore, a detector selectively sensitive to this frequency is used to indicate locking of the oscillator frequency on the wrong peak.

A. *Operation of a Molecular Beam Frequency Standard*

The operation of a twin cavity type molecular beam frequency standard may be explained largely in terms of classical physical concepts. Assume, for example, the use of the 4, 0, 3, 0 states of the cesium, $Cs^{133}$, atom. These states correspond to orientation of the spin axis of the outermost electron with and opposite to the nuclear magnetic axis. The spinning electron is a magnetic dipole, and in the higher energy 4, 0 state, it is aligned with the nuclear field. In the 3, 0 state its direction is opposite to that of the nuclear field.

If the electron is not lined up exactly with the nuclear field, a torque is exerted on the electron by this field. Gyroscopic action results and the spin axis of the electron precesses about the field. The rate of precession is essentially invariant as it depends on the angular momentum and magnetic field generated by the spinning electron, both fixed quantities, and the nuclear field which is constant for all molecules of the same substance.

Energy can be fed to an electron in the 3, 0 state by applying electromagnetic radiation from a local oscillator, the frequency of the radiation depending upon the natural precession rate of the electron. In the case of $Cs^{133}$, this energy is in the microwave region. The direction of the alternating magnetic field of the applied radiation is oriented perpendicular to the nuclear magnetic fields, which are aligned in the same direction by means of a weak, non-varying magnetic field. If the frequency of the alternating magnetic field is close to the natural precession rate of the electron, it will cause the amplitude of precession to become larger and larger until the electron spin axis is perpendicular to the nuclear field. This is the superposition state, and, as pointed out above, it is reached in the first resonant cavity.

Exposure of the cesium atoms to radiation in the first cavity serves also to correlate the electron spin precessions in the various atoms comprising the molecular beam. That is, it forces the electrons to precess in step with the alternating magnetic field. Thus, as the atoms leave the first resonant cavity, the electrons in question are precessing in phase with each other. Also, in the region between the two cavities, the electrons are undisturbed by outside forces, and they therefore precess at their invariant natural rate.

In the second resonant cavity, the electromagnetic energy, in phase with the energy then reaching the first cavity, is again applied with its magnetic field perpendicular to the nuclear field. If the frequency of the radiation is the same as the atomic resonant frequency, i.e., the precession rate of the electrons, and has not varied since the atoms left the first cavity, the precessing electrons and the radiation will be in phase. The electrons will therefore absorb additional energy and move from the superposition state to the 4, 0 state, with its field aligned with the nuclear field.

On the other hand, if the frequency of the oscillator supplying the electromagnetic energy has varied, the electron precessions will no longer be in phase with the oscillator. The exact phase difference in each case will depend on the amount of the frequency variation and the velocity of the individual atom, i.e., the time it takes the atom to traverse the distance between the two resonant cavities. If the phase difference between the supplied energy and the electron precession is sufficient, the radiation will not increase the energy of the electron, but rather will extract energy from it, and it will revert to the 3, 0 state.

B. *Velocity Dependence of Side Peak Frequencies*

In FIGURE 1 the ordinate represents the molecular beam detector output signal, which is proportional to the number of molecules in the molecular beam which have undergone a change of state upon emerging from the second resonant cavity. The abscissa represents the quantity $$(\nu-\nu_0)\frac{L}{v_1}$$

where, $\nu$ is the frequency of the radiation from the controlled oscillator used in effecting a change of state of the molecules, $\nu_0$ is the molecular resonance frequency, L is the distance between the two resonant cavities, and $v_1$ is a molecular velocity in the beam It should be noted that the quantity $$(\nu-\nu_0)\frac{L}{v_1}$$

is the difference in the number of cycles undergone by the resonance frequency and the applied radiation during the time the molecules having the velocity $v_1$ pass from the first resonant cavity to the second. Thus, for example, at the 1.0 point on the abscissa, the applied radiation has gained a full cycle on the resonance frequency during the transit time of these molecules. The curve 8 of FIGURE 1 is a resonance curve for molecules having the velocity $v_1$.

Accordingly, in view of the above discussion, a center peak 10 in the resonance curve 8 occurs when the two frequencies are exactly the same ($\nu=\nu_0$) and there is no relative phase displacement during the time the molecules traverse the distance between the two resonant cavities. As the frequency of the applied radiation from the local oscillator departs from the molecular resonance frequency, the phase difference between the electron precession and the applied radiation increases progressively, with a corresponding decrease in detector output signal. The signal reaches a minimum when the difference in the number of cycles undergone by the two frequencies is 0.5 cycle. At this point, there is a 180° phase difference between the electron precession and the applied radiation in the second resonant cavity. The radiation in the second cavity therefore has exactly the opposite effect of the radiation in the first cavity, and it returns the molecules to the first state. In other words, essentially none of the molecules attain a change in state.

As the applied radiation departs further from the resonance frequency, the difference in the number of cycles reaches a value of 1.0, and the applied radiation is therefore in phase with the electron spin precession. This results in a pair of side peaks 12 and 14 in the resonant curve. These peaks are not as high as the center peak 10, because the difference between the applied and the resonance frequencies lessens the probability of change of state, even though the precession and applied radiation are in step at the moment the molecules enter the second cavity. As the difference between the two frequencies increases, there is a progression of maxima and minima in the resonance curve, with the maxima decreasing to negligible proportions within a few cycles from the origin.

From FIGURE 1 is will be apparent that the frequency of the center peak is independent of molecular velocity, since the quantity $$(\nu-\nu_0)\frac{L}{v_1}$$

is always zero when the frequency of the controlled oscillator is the same as the molecular resonance frequency. However, the frequencies of side peaks are very much dependent on velocity. For example, if the velocity is doubled, the difference in frequency ($\nu-\nu_0$) is twice as great for points corresponding to those on the resonance curve 8. Thus, with reference to the side peak 12, a doubling of molecular velocity decreases by one half the transit time between the two resonant cavities, and, therefore, the departure of oscilaltor frequency from molecular resonance frequency must be doubled in order to provide the phase correspondence in this lesser time interval.

Accordingly, as seen in FIGURE 1, a resonance curve generally indicated at 16, for molecules having a velocity $v_2$ greater than $v_1$, has a center peak 18, whose maximum coincides with that of the peak 10. However, side peaks 20 and 22 of the curve 16 are displaced farther from the center peak than the side peaks 12 and 14 of the resonance curve 8. A resonance curve 24 for a velocity $v_3$ less than $v_1$ has a center peak 26 whose maximum coincides with that of the peaks 10 and 18 and side peaks 28 and 30, which are closer to the origin than the peaks 12 and 14.

Actually, a molecular beam ordinarily contains particles having a wide range of velocities, the velocity distribution being somewhat similar to the Maxwell distribution law. By successively selecting different velocities, one may vary the positions of the side peaks of the resonance curve, as indicated, for example, by the relative positions of the peaks 12, 20 and 28. If the controlled oscillator is locked to a side peak, the frequency correction system will develop a frequency correction signal having short term variations following the velocity variation. This variation in the correction signal is used to indicate side peak locking, as will be described in greater detail below. The manner in which the velocities are selected is as follows.

C. *Velocity and Field Dependence of Energy State Transition*

It can be shown that for optimum probability of energy state transition there is a given value of the quantity $Ht$, where H is the magnetic field of the radiation to which the molecules are subjected in the resonant cavities, and $t$ is the total time a molecule is subjected to the field H. In classical terms, this may be explained by the fact that for a given field strength, there is a corresponding time of exposure to the field to bring about a reversal of the spin axis. If the field is weaker or the time is shorter, a complete reversal will not be obtained. If the field is increased in strength or the exposure to it is increased, there will first be a reversal of the spin axis; then the axis will begin to precess again and start to return to its original orientation. The time $t$ is inversely proportional to the velocity of the molecules, and thus, for a given field strength, the conditions for change of state will be optimum for molecules in a narrow band of velocities. The probability of transition is considerably less for other velocities.

D. *Velocity Selection by Means of Amplitude Modulation*

Ordinarily, the field strength selected is the one which is optimum for the most probable velocity in the molecular beam. In this manner, the number of molecules capable of undergoing energy state transition is maximized. The most probable velocity may be assumed to be the velocity $v_1$ corresponding to the resonance curve 8 in FIGURE 1. Then by amplitude modulating the local oscillator radiation applied to the resonant cavities and thereby varying the fields within the cavities, various velocities may be successively selected, for example, the velocities in the range between $v_2$ and $v_3$. As one velocity after another is selected by means of the amplitude modulation, the upper and lower side peaks of the resonance undergo excursions between 20 and 28 and 22 and 30, respectively (FIGURE 1). If the local oscillator is locked to a side peak, the frequency stabilization system will develop a frequency correction signal which alternates in voltage in accordance with the modulation shifting the peak. In other words, the correction signal will have a frequency component corresponding to the amplitude modulation, and the circuit described below detects this component to indicate locking of the oscillator to one of the side peaks.

It is noted that the resonance curves 8, 16 and 24, which are normalized with respect to center peak output signal, show the side peaks 28 and 30 as being greater than the peaks 12 and 14, the latter peaks, in turn, being greater than the peaks 20 and 22. The differences in the heights of the side peaks are due to the same factor, noted above, that causes the side peaks to be smaller than the center peaks, viz., the relative differences between the molecular resonance frequency and the various oscillator frequencies involved. However, in a single molecular beam containing a wide spectrum of velocities, the heights of the side peaks 20 and 28, and 22 and 30 are considerably less than the heights of the peaks 12 and 14, assuming that the velocity $v_1$ is the most probable velocity. The reason for this is the materially smaller numbers of molecules having the velocities $v_2$ and $v_3$ corresponding to the curves 16 and 24. The smaller numbers of molecules result in smaller voltages at the output of the molecular beam detector when these velocities are selected. For the same reason, the peaks 18 and 26 are significantly smaller than the peak 10.

Accordingly, the height of the composite center peak resulting from superposition of the resonance curves for the various velocities varies with the amplitude modulation of the radiation from the local oscillator, and, as shown below, this variation may be used to maintain the average value of the fields in the resonant cavities at a value which maximizes the output signal of the molecular beam detector.

The following detailed description of our invention refers to a cesium molecular beam frequency standard of the type disclosed in the above copending application Serial No. 693,104.

II. SPECIFIC DESCRIPTION OF THE INVENTION

A. *Frequency Stabilization System*

As seen in FIGURE 2, a frequency standard incorporating the principles of our invention includes a molecular beam resonance unit generally indicated at 40. The resonance unit 40 includes a molecular beam source 42 adapted to project a beam of cesium molecules through an evacuated tube 44 extending through a separator 46. The separator 46 may take the form of a magnet adapted to pass an intense inhomogeneous field through the tube 44. The cesium atoms in the $f=3$, $m_f=0$ state are deflected around a bend 48 in the tube 44 by the magnetic field and then proceed along the axis of the tube, while the atoms in the 4, 0 state are deflected against the walls of the tube where they may be adsorbed by suitable getter material (not shown). The beam now including the bulk of the 3, 0 atoms, passes from the tube 44 through a first microwave cavity 50 and then through a connecting tube 52 to a second microwave cavity 54. The cavities 50 and 54 resonate at the frequency $\nu_0$, and some of the molecules are elevated to the 4, 0 state therein.

Finally, the beam travels through a tube 56 extending through a second separator 58 to a detector 60. In the separator 58, which is similar to the separator 56, the atoms in the 4, 0 state are deflected around a bend 62 in the tube 56 and then pass along the axis of the tube to the detector 60. The atoms in the 3, 0 state are deflected against the wall of the tube to be adsorbed or diffused as indicated above. The detector 60 provides an electric signal whose magnitude is a function of the number of molecules coming from the separator 58.

The microwave cavities 50 and 54 are supplied with electromagnetic energy from the high frequency output 64a of an electronic generator 64. The nominal frequency of this energy is the resonance frequency $\nu_0$ of the cesium (3, 0)<—>(4, 0) transition used as a frequency-standardizing mechanism. The output 64a is coupled to the resonant cavities 50 and 54 by waveguides 66 and 68. Thus, the molecular beam is exposed to the microwave radiation in the cavities 50 and 54, and atoms in the 3, 0 state are raised to the 4, 0 state and detected by the detector 60. The number of atoms undergoing this change of state depends on the correspondence of the frequency of the microwave energy in the cavities 50 and 54 to the natural atomic resonance frequency, $\nu_0$ of the transition. The closer the microwave energy is to the atomic resonance frequency, the greater will be the number of atoms elevated to the 4, 0 state and the larger the magnitude of the output from detector 60. The output of the detector is applied to a servosystem which regulates the frequency of the generator 64 to maximize the output of the detector and thereby maintain the high frequency output of the generator at the frequency $\nu$.

More specifically, the output of the detector 60 is amplified by an amplifier 70 and then passed to a two-phase motor 74. The latter operates a variable condenser 76 controlling the frequency of the generator 64. The motor 74 is also excited by a 100 cycle ($f_1$) generator 78 whose output is used to phase modulate the high frequency output of the generator 64 at a 100 cycle rate. The phase modulation of the microwave energy moves the frequency thereof back and forth over the peak of the atomic resonance curve on which the generator is locked, resulting in amplitude modulation of the output of the detector 60. If the frequency of the phase modulated microwave energy differs from the peak frequency, there will be a 100 cycle component in the output of the detector 60, and this will cause the motor 74 to rotate the condenser 76 in the proper direction to correct the error. When the frequency of the microwave energy corresponds with the peak, a 200 c.p.s. component is developed in the output of the detector 60, but not a 100 c.p.s. component. The servosystem does not respond to the 200 c.p.s. component; there must be a 100 c.p.s. signal input to motor 74 from the detector 60 for the frequency of generator 64 to be changed.

While the generator 64 is schematically indicated in FIGURE 2 by a single block, it actually consists of several units, including an oscillator controlled by the motor 74 and synthesizing circuits comprising frequency multipliers, dividers and adders adapted to provide the high frequency $\nu_0$ at the output 64a, as well as various low frequency outputs 64b, which serve as the frequency-stabilized outputs of the system. Phase modulation of signals at the output 64a may be accomplished by a conventional balanced phase modulator included in the generator. The constituent parts of the generator 64 are disclosed in greater detail in the above copending application, Serial No. 693,104, and also the application of Mainberger for "Frequency Control Apparatus," serial No. 744,729, filed June 26, 1958.

B. *Side Peak Stabilization Detector*

(1) *Construction.*—The circuit used to determine automatically whether the generator 64 is locked on a side peak of the resonance curve will now be described in detail. As shown in FIGURE 2, an amplitude modulator 80 is connected between the generator output 64a and the waveguides 66 and 68. The modulator varies the amplitude of the radiation applied to the cavities 50 and 54 in accordance with the output voltage of a generator 81. The frequency, $f_2$, of the generator 81 is preferably less than the 100 c.p.s frequency $f_1$; it should also be selected so that none of the harmonics of $f_2$ equal $f_1$. Thus, $f_2$ may be 15 c.p.s. for example.

Modulation of the R.F. energy applied to the resonant cavities 50 and 54 effectively shifts the side peaks of the molecular resonance curve (FIGURE 1) back and forth in the manner described above while leaving unchanged the position of the center peak. Therefore, when the generator 64 is locked to the frequency of a side peak, the error signal developed in the frequency-controlling servosystem, which indicates the deviation of the oscillator from the side peak frequency, increases to a maximum value in one direction, decreases through zero potential to a maximum in the opposite polarity and once again increases through zero. The rate at which it does this is the same as the rate of side peak shift, which in turn is equal to the frequency $f_2$ of the generator 81.

Accordingly, we have included a phase detector 82 which has as one of its inputs the output signal of the molecular beam detector 60. The other input is from the generator 78. The outputs of the detector 82 and the generator 81 are the inputs of a second phase detector 84, and the output of the latter detector serves as the input for an indicator unit 86. The indicator unit indicates the presence of an output voltage from the detector 84 and preferably also the polarity of this voltage. For example, a pair of lights 86a and 86b may be connected in series with diodes (not shown) across the output terminals of the detector 84. If the diodes are connected to conduct in opposite directions, one light will be energized when the polarity of the detector output is positive and the other when it is negative. The unit 86 may include an amplifier, if necessary, to increase the power available for the lights. It may also include an audible alarm, energized when the output voltage of the detector 84 increases above a minimal level.

(2) *Operation.*—The frequency correction or error signal, as developed by the two-phase motor 74, is a torque exerted on its rotor to align the actual position of the motor shaft with the position corresponding to coincidence of the frequency of the generator 64 with the pertinent peak of the molecular resonance curve.

The phase detector 82 operates analogously to the motor 74 and develops the error signal as output voltage which, when the frequency correcting system is locked to a side peak, contains a component at the frequency $f_2$ of the generator 81. The phase detector 84 provides an output voltage only if there is such a component in the output of the detector 82. Furthermore, the component at frequency $f_2$ from the detector 82 is either in phase or in phase opposition to the output of the generator 81, depending on whether the side peak to which the system is locked is higher or lower in frequency than the center peak. An indicator unit of the type described above will thus indicate in which direction a correction must be made in order to stabilize the system on the center peak of the resonance curve.

More specifically, assume that on a first half cycle of the voltage from the generator 81 the amplitude modulator 80 causes the power applied to the resonant cavities 50 and 54 to increase from its average value and on the next half cycle to decrease from its average value. In accordance with the principles set forth above, on the first half cycle, the resonance pattern will shift toward the curve 16 and on the second half cycle toward the curve 24. Thus, if the system is stabilized on the high frequency peak (on the right of the center peak in FIGURE 1), the error signal will tend to shift the generator 64 frequency upwardly on the first half cycle. On the other hand, if the generator is locked to a low frequency side peak, the error signal will tend to move its frequency downwardly on the first half cycle and upwardly on the second half cycle. Thus, the phase of the $f_2$ component in the error signal depends on whether it is a high frequency or a low frequency side peak on which the generator 64 is locked.

Preferably, the time constant of the frequency correction mechanism is made long compared to the period of the variations in the error signal caused by the amplitude modulation, i.e., long compared to one-fifteenth second. For example, when a two phase motor is used, as described above, to adjust the frequency of the generator 64, the moment of inertia of the shaft of the motor may be made large enough so that the motor cannot follow the fifteen cycle error excursion of the generator. The error signal will then be materially greater than if the motor were to follow closely the movement of the side peak to which the generator 64 is locked, and, thus, a greater voltage may be derived from the phase detector 82.

(3) *Advantages of the detector.*—From the above, it will be apparent that, among the important advantages of our warning system, are its relative simplicity, its compatibility with the frequency controlling system presently used and its ability to distinguish between high frequency and low frequency side peaks. A further advantage results from the fact that it can distinguish a side peak of the resonance pattern from the center peak regardless of the relative heights of the two peaks or their closeness in frequency. This ability of the system stems from the fact that it makes use of readily distinguished characteristics of the peaks, that is, their behavior when the intensity of the radiation applied to the resonant cavities 50 and 54 is modulated. It permits the use of the lower velocity molecules in the beam, with a resulting improvement in the resolution of the frequency stabilizing system.

More specifically, as seen in FIGURE 1, the resonance curve 24, for molecules having a lower velocity than those corresponding to the curves 8 and 16, has a center peak 26 which is sharper than the center peaks of the other curves. Use of the peak 26 in frequency stabilization of the generator 64 will therefore provide a greater error signal for a given deviation of generator frequency from the molecular resonance frequency. The side peaks 28 and 30 of the curve 24 are closer to the center peaks than are the side peaks of the curves 8 and 14, and, therefore, as explained above, the peaks 28 and 30 are of greater amplitude relative to the center peak 26 associated with them. Furthermore, if a still lower velocity than the velocity $v_3$ giving rise to the curve 24 is selected, the side peaks will be even closer to the center peak in both frequency and amplitude. Prior side peak warning systems have not proved sufficiently reliable under this condition, thus requiring the use of the broader resonance curves associated with greater separation between center peak and side peaks.

One way of selecting the low velocity molecules providing a resonance curve with a sharp center peak is by adjustment of the angle of the bend 48 in the tube 44. In passing through the separator 46, the molecules are angularly displaced from their line of flight according to their velocities, the slow molecules being displaced more than the faster ones. Accordingly, the bend 48 may be angled so as to project the slower moving molecules along the axis of the tube 52 and microwave cavities 50 and 54. Assuming that the detector 60 has a narrow opening aligned with this axis, only these molecules will be detected for use in the frequency stabilizing function of the system.

C. *Automatic Correction of Wrong-Peak Condition*

The system may also contain an impulse motor 87, coupled to the shaft of the capacitor 76 and controlled by the indicating voltages developed in the unit 86. The motor 88 may, by way of example, comprise a pair of solenoids having armatures connected to the capacitor shaft through suitable linkage and adapted thereby to rotate the shaft in opposite directions. The solenoids are connected to a power source (not shown) by triggers actuated by sufficient voltages on the lamps 86*a* and 86*b* to indicate side-peak locking. Thus, at the same time that a lamp lights to indicate side-peak locking, one of the solenoids in the motor 87 is energized to give the capacitor a short impulse in the direction of the center peak of the resonance curve. Assuming that the impulse is sufficient to bring the system to the vicinity of the center peak, the motor 74 will then take over to bring the frequency of the generator 64 to the correct value.

In another arrangement, the motor 87 may be an ordinary reversible electric motor with a substantially greater torque than the motor 74. A signal from the indicator unit 86 starts the motor in the right direction for a slow variation of the capacitor 76. When the frequency of the generator 64 reaches another peak of the molecular resonance pattern, a signal from the detector 82 causes the motor 87 to stop, and the motor 74 once again takes control of the capacitor 76. If the new peak is the correct one, there is no further operation of the motor 87. Otherwise, the presence of another signal from the unit 86 will cause the motor 87 to shift the generator 64 to the next resonance peak.

D. *Summary*

Thus, by amplitude modulating the R.F. power applied to the resonant cavities, we have derived signals which are useful in indicating locking of the controlled oscillator to the wrong peak on the molecular resonance curve. The amplitude modulation causes an in-step variation in the frequencies of the effective side peaks, resulting in a modulation frequency component in the frequency-correcting error signal. This component is detected in a phase detector whose output voltage is used by an indicator unit in indicating both the presence of a side peak condition and whether the side peak is lower or higher in frequency than the center peak of the resonance curve.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. Molecular beam apparatus of the type in which radiation from a generator is applied to a molecular beam, a molecular beam detector develops a signal representing the number of molecules in said beam changing state as a result of said radiation and said generator is frequency-stabilized on a peak of molecular resonance pattern by means of a first servo-system deriving an error signal from said detector signal, said apparatus including indicator means for determining stabilization of said generator on a peak other than a peak corresponding to a molecular resonance, said indicator means including an amplitude modulator for modulating the radiation from said generator applied to said molecules, means for detecting in said error signal a component at the frequency of said amplitude modulation, and means for indicating the presence of said component at the frequency of said amplitude modulation.

2. The combination defined in claim 1 including a phase detector adapted to compare said error signal with the amplitude modulation of said radiation.

3. The combination defined in claim 2 including means for phase modulating said radiation, whereby said detector signal varies in accordance with said phase modulation, a first phase detector connected to compare said detector signal with the signal controlling said phase modulation, and a second detector connected to compare the output of said first phase detector with the amplitude modulation signal.

4. The combination defined in claim 3 including indicating means connected to indicate the presence of an output signal from said second phase detector and the polarity of said output signal.

5. The combination defined in claim 1 including means for controlling the average power of said radiation in such manner as to minimize the component of said detector signal at the frequency of said amplitude modulation.

6. A molecular beam device of the type having means forming a molecular beam, an energy source supplying energy at a transition frequency of said beam, means adapted to subject said beam to said energy, a detector adapted to develop a signal dependent on the number of particles in said beam and means controlling the frequency of said source in response to said detector signal, the combination of means for amplitude modulating said energy and means for detecting in said detector signal a component at the amplitude modulation frequency.

7. The combination defined in claim 6 including means for controlling the average amplitude of said energy in such manner as to minimize said component in said detector signal.

8. In a molecular beam device of the type having means forming a molecular beam, an energy source supplying energy at a transition frequency of said beam, means adapted to subject said beam to said energy, a molecular beam detector for developing a signal dependent on the number of particles in said beam undergoing a transition in response to said energy and means controlling the frequency of said source in response to said signal to thereby stabilize said frequency at the frequency of a peak in a resonance curve of said beam, the improvement comprising the combination of a modulator adapted to amplitude modulate said energy and means for developing a signal from said detector signal indicative of frequency shift of said peak in response to the amplitude modulation of said energy.

9. The combination defined in claim 8 including means responsive to components of said detector signal resulting from said amplitude modulation and connected to adjust the average level of said energy so as to maximize the number of particles detected by said detector.

10. A molecular beam frequency standard comprising, in combination, a molecular beam source projecting a molecular beam, an energy source supplying electromagnetic energy at a transition frequency of said beam, means for subjecting the molecules in said beam to said energy during two spaced intervals, a molecular beam detector for developing a signal proportional to the number of particles in said beam undergoing a transition in response to said electromagnetic energy, a first generator having an output voltage at a first frequency, means for frequency modulating said energy in response to the output of said first generator, a first detector effecting a comparison between said detector signal and said output of said first generator, means for adjusting the frequency of said energy in response to said comparison in such manner as to minimize the fundamental component of said first frequency in said detector signal, a second generator having an output at a second frequency, an amplitude modulator for modulating said energy in accordance with the output of said second generator, a first phase detector connected to compare said detector signal with the output of said first generator, a second phase detector connected to compare the output of said first phase detector with the output of said second generator and an indicator responsive to the output of said second phase detector.

11. The combination defined in claim 10 in which said indicator is adapted to indicate the polarity of the output of said second phase detector.

12. The combination defined in claim 10 in which said second frequency is substantially less than said first frequency.

13. The combination defined in claim 12 in which the response time of the frequency correction system including said frequency adjusting means is substantially greater than the period of the output of said second generator.

14. The combination defined in claim 10 including a third phase detector connected to compare said molecular beam detector signal with the output of said second generator and means for controlling the average amplitude of said energy in accordance with the comparison by said third phase detector so as to minimize the second frequency component in said molecular beam detector signal.

15. The combination defined in claim 10 including means repsonsive to the output of said second phase detector for applying an impulse to said frequency adjusting means to shift the frequency of said energy toward the center peak of the resonance curve at said frequency when said frequency adjusting means has locked said standard to a side peak of said curve.

No references cited.